United States Patent [19]

Watson et al.

[11] 4,396,462

[45] Aug. 2, 1983

[54] METHOD FOR INHIBITING THE FORMATION OF POLYMERIZED VINYLAROMATIC COMPOUNDS DURING DISTILLATIVE PURIFICATION OF VINYLAROMATIC MONOMER

[75] Inventors: James M. Watson, Big Spring, Tex.; William J. I. Bracke, Hamme, Belgium

[73] Assignee: Cosden Technology, Inc., Dallas, Tex.

[21] Appl. No.: 255,892

[22] Filed: Apr. 20, 1981

[51] Int. Cl.³ .............................................. B01D 3/34
[52] U.S. Cl. .................................... 203/9; 202/267 R
[58] Field of Search ....................... 203/86, 9, 91, 94; 202/267 R

[56] References Cited

U.S. PATENT DOCUMENTS 4,033,829  7/1977  Higgins et al. ........................ 203/9
4,105,506  8/1978  Watson ................................. 203/9

OTHER PUBLICATIONS

Boundy and Boyer, *Styrene*, p. 201.

Primary Examiner—Frank Sever

[57] ABSTRACT

A method for inhibiting the formation of undesired polymer accumulations during distillative purification of vinylaromatic monomers such as styrene, alpha-alkylstyrene, vinyltoluene, divinylbenzene or the like comprising distilling the vinylaromatic monomer in the presence of a cupreous material such as metallic copper or a copper alloy, and apparatus for carrying out the method in which at least a portion of the interior of a distillation column used to purify vinylaromatic monomer, particularly in areas where there is little vapor movement, is provided with a surface layer or coating of cupreous material.

26 Claims, 2 Drawing Figures

METHOD FOR INHIBITING THE FORMATION OF POLYMERIZED VINYLAROMATIC COMPOUNDS DURING DISTILLATIVE PURIFICATION OF VINYLAROMATIC MONOMER

BACKGROUND OF THE INVENTION

This invention relates to a process and apparatus for producing readily polymerizable vinylaromatic compounds. More particularly, this invention relates to a process and apparatus for inhibiting the formation of undesired polymeric material during distillative purification of vinylaromatic monomers.

Vinylaromatic monomers, such as styrene, alpha-alkylstyrene, vinyltoluene, divinylbenzene and the like, are important for their ability to form useful polymeric materials. These compounds are typically prepared by catalytic dehydrogenation of alkylaromatic compounds having corresponding carbon chains. The crude product of the dehydrogenation reaction, however, is a mixture of materials comprising in addition to the desired vinylaromatic monomer, various alkylaromatic compounds as well as oligomers of the desired monomer. These other substances must be separated from the vinylaromatic monomer to obtain a commercially useful product.

The useful method for separating a desired vinylaromatic monomer from the dehydrogenation product mixture is to pass the mixture through a distillation train in which lower boiling materials are first separated and then the desired monomer is distilled from the higher boiling materials. Such distillative separations are complicated by the fact that the tendency of the monomer to polymerize increases with increasing temperature. Thus, as the mixture is heated to distill it, the formation of undesired polymer increases and the yield of desired monomer decreases.

Various measures have been utilized to minimize the undesired polymer formation. Vacuum distillation has been resorted to to reduce the temperature to which the feed mixture must be heated. While this is helpful in reducing the formation of undesired polymeric material, substantial amounts of polymer still are formed.

Polymerization inhibitors have been added to the feed mixture. Known inhibitors further reduce the formation of undesired polymer, but still are not totally effective. Moreover, such inhibitors may be expensive and contribute substantially to the production costs for the vinylaromatic monomer.

A particular problem arises in areas in the distillation apparatus where there is little vapor motion, such as adjacent the undersides of the seal pans. In such low velocity areas, monomer vapors condense against the cool undersides of the pans and form droplets of liquid monomer which may polymerize and solidify before they grow large enough to drop down into the underlying tray. Masses of unwanted polymeric material thus build up in the distillation apparatus. Liquid phase active inhibitors do not prevent such deposits because the condensing vapors do not carry these inhibitors with them. Even the use of vapor phase active inhibitors is not totally effective in supressing the formation of such deposits, since the lack of vapor motion in the low velocity areas restricts the mixing of the inhibitor with the condensing vapors.

The continuing accumulations of undesired polymeric material thus require that a distillation apparatus used to purify vinylaromatic monomers be periodically shut down and cleaned of the fouling polymer. As the polymer is typically a dense hard material, considerable difficulty may be encountered in cleaning the distillation apparatus. The need for periodically cleaning contributes substantially to operating costs, and capital costs are also increased because additional distillation capacity must be constructed in order to compensate for the down time of the distillation apparatus.

Not only is the yield of monomer decreased and the productivity of equipment lessened by reducing effective capacity and by requiring periodic shutdowns for cleaning, but the insoluble residues produced by the undesired polymerization of the monomer constitute a waste material which must be disposed of. Governmental restrictions on waste disposal make this an ever increasing problem.

Despite the efforts of the prior art, there remains a substantial need for improved methods and apparatus for inhibiting the formation of undesired polymeric residues in distillation apparatus used to purify vinyl aromatic monomers.

Objects of the Invention

Accordingly, it is an object of the present invention to provide an improved method and apparatus for inhibiting the formation of polymerized vinylaromatic compounds during distillative purification of a crude vinylaromatic monomer feed.

Another object of the present invention is to provide a method and apparatus for inhibiting the formation of polymerized vinylaromatic compounds which will not increase the need for expensive chemical inhibitors.

A further object of the present invention is to provide a method and apparatus for inhibiting the formation of polymerized vinylaromatic compounds which will permit distillation systems used to purify vinylaromatic monomers to be run for longer periods before shutdown for cleaning becomes necessary.

It is also an object of the present invention to provide method and apparatus for inhibiting the formation of polymerized vinylaromatic compounds which is especially effective in areas of the distillation apparatus where there is little vapor motion.

Yet another object of the present invention is to provide a method and apparatus for inhibiting the formation of polymerized vinylaromatic compounds during distillative purification of a vinylaromatic monomer which will increase the yield of monomer.

A further object of the present invention is to provide a method and apparatus for inhibiting the formation of polymerized vinylaromatic compounds during distillative purification of vinylaromatic monomer which will decrease the amount of residues which need to be disposed of.

An additional object of the present invention is to provide a method and apparatus for purifying a vinylaromatic monomer which will decrease the formation of undesired soluble and insoluble polymer by-products.

A still further object of the present invention is to provide a method for distilling a vinylaromatic monomer which inhibits fouling of the distillation column and an apparatus for distilling a vinylaromatic monomer which is less prone to fouling.

It is also an object of the present invention to provide a method and apparatus for producing substantially pure vinylaromatic monomer which is more economical than prior art methods.

SUMMARY OF THE INVENTION

These and other objects of the invention are achieved by providing a method for inhibiting the formation of polymerized vinylaromatic compounds during distillative purification of vinylaromatic monomer from a crude feed comprising vinylaromatic monomer admixed with lower and higher boiling materials comprising distilling said vinylaromatic monomer from said crude feed in the presence of a cupreous material.

The objects of the invention are also achieved by providing apparatus for inhibiting the formation of polymerized vinyl aromatic compounds during distillative purification of vinyl aromatic monomer from a crude feed comprising vinyl aromatic monomer admixed with lower and higher boiling materials comprising recycle distillation column means for separating a recycle overhead fraction comprising lower boiling materials from a recycle bottoms fraction comprising vinylaromatic monomer and higher boiling materials, means for introducing said crude feed into said recycle distillation column means, means for maintaining said recycle distillation column means at an appropriate distillation temperature, finish distillation column means for separating a finish overhead fraction of substantially pure vinylaromatic monomer from a finish bottoms fraction containing higher boiling materials, means for withdrawing said recycle bottoms fraction from said recycle distillation column means and introducing said recycle bottoms fraction into said finish distillation column means, means for maintaining said finish distillation column means at an appropriate distillation temperature, means for collecting said finish overhead fraction of substantially pure vinylaromatic monomer, and means for contacting vinylaromatic monomer in at least one of said recycle distillation column means and said finish distillation column means with a cupreous material.

It has long been taught that copper and copper alloys, such as brass, should not be used in equipment for handling vinylaromatic monomers because experience showed that if vinylaromatic monomers contacted copper or copper-bearing alloys, they picked up enough copper to give a definite inhibitor action during subsequent polymerization. See Boundy and Boyer, *Styrene*, page 201. For this reason, the art has scrupulously avoided the use of copper and brass fittings in all equipment used to handle vinylaromatic monomers.

The present invention proceeds directly contrary to the conventional wisdom and makes use of the inhibiting action of copper toward polymerization of vinylaromatic monomers to inhibit the formation of undesired polymeric materials in the distillation apparatus used to purify crude vinylaromatic monomers. Contrary to the expectation of the art, it has been found that the monomer does not pick up enough copper as it passes through the distillation train to give any discernible latent inhibition when it is subsequently desired to polymerize the purified vinylaromatic monomer.

BRIEF DESCRIPTION OF THE DRAWINGS

The invention will be further explained with reference to the accompanying drawings wherein.

DETAILED DESCRIPTION OF PREFERRED EMBODIMENTS

Figure 1:
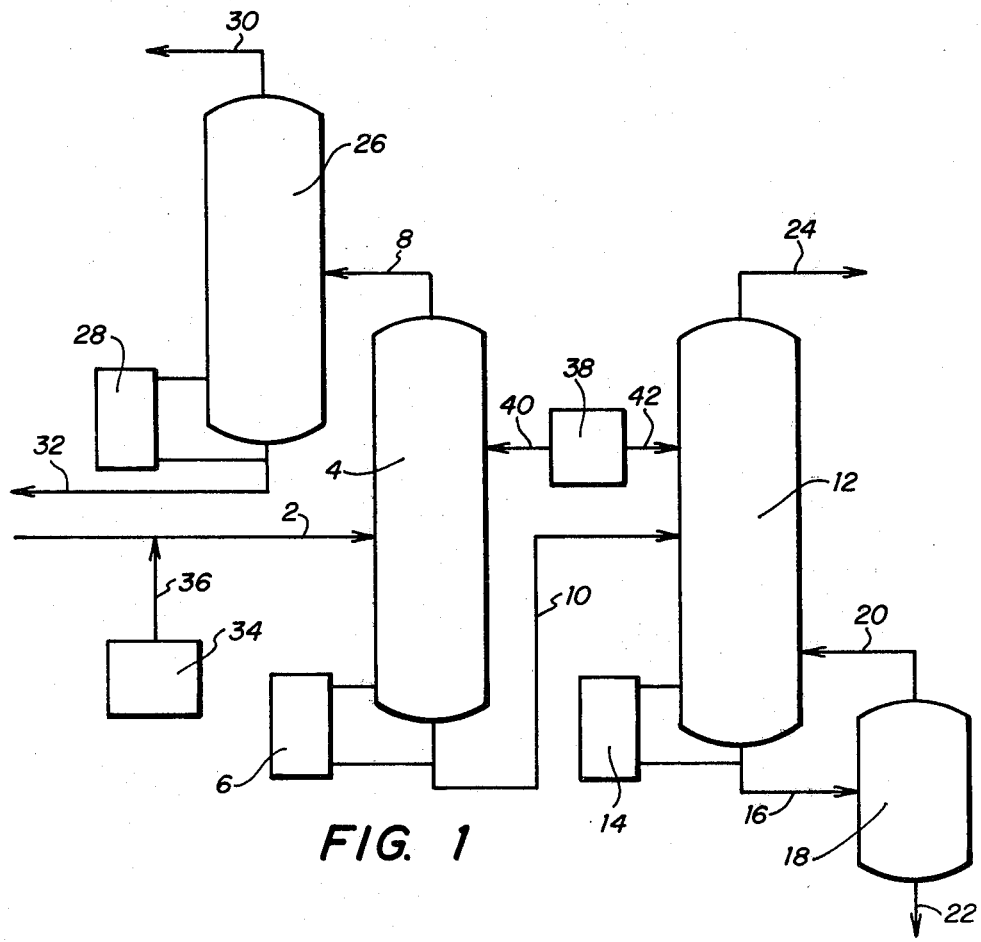
FIG. 1 is a schematic representation of a distillation system for purifying a crude vinylaromatic monomer.

Referring now to the drawings, FIG. 1 shows schematically a distillation system for purifying crude vinylaromatic monomer. The illustrated system will be described in conjunction with the distillation of vinyltoluene, but it is understood that the distillation system and the invention are useful for purifying other vinylaromatic monomers such as styrene, alpha-methylstyrene, divinylbenzene and the like. It is considered within the skill of the art to adjust the operating parameters as necessary to adapt the system to other vinylaromatic monomers.

A crude vinyltoluene feed recovered from the dehydrogenation of ethyltoluene is condensed and introduced through line 2 into the intermediate portion of a recycle distillation column 4. Recycle column 4 is a conventional multi-tray distillation column containing suitable vapor/liquid contact devices such as bubble cap trays, perforated trays, valve trays, etc. Preferably, the distillation column is of the parallel distillation path design. Typically, the number of trays in recycle column 4 will range between 40 and 100. Preferably at least 72 trays are provided in the recycle column in order to facilitate proper separation of the constituents of the crude vinyltoluene feed mixture.

The recycle column is typically operated at temperatures ranging between about 65 and about 138 degrees C. and at absolute pressures ranging from about 0.013 to about 0.26 atmospheres (10 to 200 mm Hg). Preferably distillation temperatures in the recycle column lie between about 90 and about 115 degrees C. and the pressure is maintained between about 0.025 and about 0.04 atmospheres (20 to 30 mm Hg) in the overhead. A reboiler 6 is associated with distillation column 4 to provide the heat necessary to maintain distillation conditions in the column. Reboiler temperatures are maintained between about 52 and about 121 degrees C. by controlling the reboiler pressure between about 0.04 and about 0.53 atmospheres (30 to 400 mm Hg).

A recycle overhead fraction comprising principally a mixture of lower boiling alkylaromatic compounds such as ethyltoluene, xylene and toluene is withdrawn from the top of recycle column 4 through line 8.

The recycle bottoms fraction comprising principally vinyltoluene admixed with higher boiling materials such as vinyltoluene oligomers is withdrawn from the bottom of recycle column 4 through line 10 and introduced into the intermediate portion of finish distillation column 12. Finish column 12 is a multi-tray distillation column similar in design to recycle column 4. Finish column 12 typically contains between about 20 and about 40 trays. The finish column is operated at a temperature lying in the range from about 80 to about 110 degrees C. and at an absolute pressure lying in the range from about 0.025 to about 0.04 atmospheres (20 to 30 mm Hg) in the overhead. A reboiler 14 is associated with finish column 12 to provide the heat necessary to maintain appropriate distillation conditions in the finish column.

The finish column overhead fraction withdrawn from column 12 through line 24 comprises substantially pure vinyltoluene.

The finish column bottoms fraction, comprising principally tarry residues admixed with some residual vinyltoluene monomer, is withdrawn from the bottom of finish column 12 through line 16 and introduced into a flash pot 18 where it is flashed to separate the residual monomer from the tarry residues. The recovered residual monomer is conveyed from flash pot 18 via line 20 to product line 24. The tarry residues are discharged from flash pot 18 through line 22 for disposal.

In the illustrated distillation scheme, the recycle overhead fraction withdrawn from recycle column 4 through line 8 is introduced into an alkylbenzene distillation column 26. Alkylbenzene column 26 is also a conventional distillation column similar in design to recycle column 4, except that the alkylbenzene column typically contains 40 or fewer trays. The alkylbenzene column is operated at a temperature from about 140 to about 170 degrees C. and at an absolute pressure from about 0.9 to about 1.5 atmospheres. A reboiler 28 is associated with alkylbenzene column 26 to provide the heat necessary to maintain appropriate distillation conditions in the distillation column. An overhead fraction comprising low boiling aromatics such as xylene, toluene and/or benzene is withdrawn from the top of alkylbenzene column 26 through line 30. This fraction may be used as a solvent material or may be conveyed to further reaction steps such as isomerization or alkylation. The alkylbenzene column bottoms fraction comprising principally the vinyltoluene precursor, ethyltoluene, is withdrawn from the bottom of alkylbenzene column 26 through line 32 and returned to the dehydrogenation reactor to produce additional vinyltoluene.

Generally, polymerization inhibitors are introduced into the vinyl aromatic monomer during the distillation. Preferred inhibitors include nitrated phenolic compounds such as dinitro-o-cresol, dinitro-p-cresol, m-nitro-p-cresol, dinitrophenol, N-nitroso-diphenylamine, 4-halo-3,5-dinitrotoluene, 3-nitro-2,5-cresotic acid and the like. Sulfur may also be used as an inhibitor, but its use is not preferred because the resulting sulfur-containing tarry residues have practically no economic value and are very difficult to dispose of. Mixtures of inhibitors may be used. A particularly preferred inhibitor comprises a mixture of N-nitroso-diphenylamine (NDPA) which is active primarily in the vapor phase and dinitro-p-cresol (DNPC) which is active primarily in the liquid phase.

The inhibitors may be introduced in any desired manner. Inhibitor from a source of inhibitor 34 may be introduced through line 36 into the crude vinyltoluene feed in line 2 prior to introduction of the feed into recycle column 4. Inhibitor from a source 38 may be introduced directly into recycle column 4 through line 40. If desired, inhibitor from a source 42 may be introduced into flash pot 18 through line 44. If desired, inhibitor may be added to the reboilers. It is also possible to add inhibitor to the batch column in vinyltoluene service.

The amount of inhibitor required depends upon the specific inhibitor used, but generally lies between about 50 and about 3000 ppm with respect to the vinyltoluene. Higher amounts may be utilized, but ordinarily little benefit is gained from the additional expenditure. In most cases, the inhibitor concentration will lie between about 200 and about 1000 ppm with respect to the vinyltoluene. Since the inhibitors are generally stable, the tarry residues recovered from the flash pot contain appreciable amounts of inhibitor. The amount of fresh inhibitor required to be introduced into the distillation system may optionally be reduced by recycling a portion of the inhibitor-containing tarry residues back to recycle column 4 either by mixing the residue with the crude feed entering through line 2 or by introducing the residue directly into the recycle column.

Figure 2:
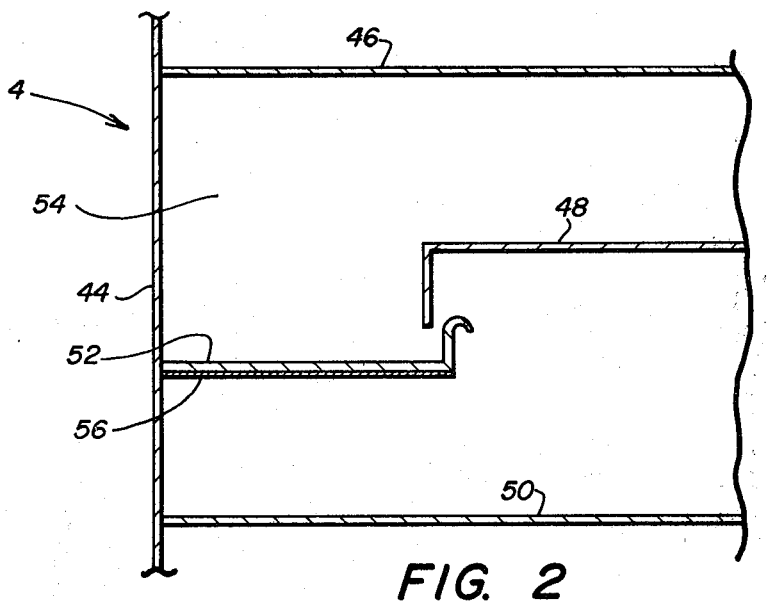
FIG. 2 is a schematic sectional representation of a portion of a distillation column for purifying vinylaromatic monomer.

FIG. 2 is a partial schematic sectional view of recycle column 4 showing a portion of the column wall 58 and three successive distillation trays 46, 48 and 50, respectively. A seal pan 52 is located under the downcomer area 54 of tray 48. The underside of seal pan 52 is provided with a cupreous surface coating 56. The cupreous coating preferably is metallic copper. Copper alloys with tin (bronze), zinc (brass), or nickel (cupronickel) may also be used.

The coating may be applied in any suitable fashion. A preferred technique is to electroplate a copper layer on the bottom of the seal pan. Suitable coatings may also be formed by disposing a layer of cupreous metal powder over the bottom surface of the seal pan and sintering the powder to form a fused layer. Alternatively, the seal pans could be formed from stock material which has been roll clad with a copper surface layer. Another option for providing the cupreous layer on the bottom of the seal pan is to spray coat cupreous material on the bottom of the pan. Application techniques which provide a cupreous layer having a large surface area are especially desirable because the inhibiting action is surface area dependent. The thickness of the cupreous coating is not critical so long as the coating presents a copper-containing surface for contact with vinylaromatic monomers in the distillation column.

During distillation in the column, vinyltoluene vapors from tray 50 rise through the column toward tray 48. Vapors contacting the cool underside of seal pan 52 condense, forming droplets of vinyltoluene on the lower surface of the seal pan. Chemical inhibitors added to the vinyltoluene feed or to the distillation column, are not wholly effective to prevent polymerization of such droplets. In the absence of some means to inhibit polymerization of the droplets, polymeric particles will form on the underside of the pan. Such particles either drop off into the distillation apparatus and contribute to fouling of other sections of the apparatus, or they build up to form a mass of polymeric material under the seal pan.

The presence of the cupreous layer on the bottom of the seal pan, however, inhibits polymerization of the condensing droplets until the droplets become large enough to fall back into the underlying tray. Thus by use of seal pans provided with a cupreous surface layer or coating, the distillation of vinyltoluene is made to take place in the presence of copper, and undesired polymerization of the vinyltoluene is inhibited.

The seal pan is, of course, merely an illustrative example of one low vapor velocity area in the distillation column where condensing vapors tend to build up polymeric masses. It is understood that other areas in the interior of the distillation column where there is little vapor movement can and will also be provided with cupreous layers.

While the drawing illustrates the provision of a cupreous layer in the recycle column for contacting vinylaromatic monomer during distillation thereof, it is understood, however that cupreous coatings or layers can also be provided at suitable locations in the finish column or in both the recycle and finish columns.

The presence of the copper in the cupreous layer in contact with the vinyl toluene during the distillation thus inhibits the accumulation of undesired polymer in the distillation apparatus and increases the yield of the monomer. The distillation train can therefore be run for longer periods before shut-down for cleaning becomes necessary. The production of monomer is made more economical.

Importantly, the copper layer does not adversely affect the effectiveness or stability of other inhibitors. It is therefore possible to use the copper layers in conjunction with other chemical inhibitors. The use of a cupreous layer in contact with the distilling vinylaromatic monomer may reduce the amount of other inhibitors required for effective control of polymerization of the monomer in the distillation column, thereby producing additional cost savings.

The final vinyltoluene product distilled from the insoluble and soluble residues in the finish column does not contain any of the copper so that there is no latent inhibition found in the finish column overhead product which would adversely effect the ultimate usefulness of the monomer for forming desired polymeric articles. Any copper values picked up by the monomer during passage through the distillation train, accumulate in the tarry residue recovered from the bottom of the flash pot.

Test 1

The following test demonstrates the effectiveness of the present invention:

Nine small vials were each filled with three milliliters of crude vinyltoluene obtained by dehydrogenation of ethyltoluene. The crude material was a light yellow, non-viscous liquid. The first three vials served as control vials and were sealed without addition of any inhibiting agents. To each of the next three vials were added 40 milligrams of finely powdered copper metal. The final three vials contained, in addition to 40 milligrams of finely divided copper metal, 500 ppm of dinitro-para-cresol (DNPC) and 200 ppm nitroso-diphenylamine (NDPA). All nine vials were then placed in an oven at 112 degrees C. and observed.

After four hours the crude vinyltoluene in the first three vials had become highly viscous. The vinyltoluene in the second three vials had also increased in viscosity. No change was apparent in the crude vinyltoluene samples in the final three vials.

After seven hours, the crude vinyltoluene in the first three vials had reacted to form a highly viscous mass which was partially insoluble in toluene. The second three samples showed little apparent increase in viscosity over that observed after four hours heating. The vinyltoluene samples from the second three vials were still completely soluble in toluene after seven hours. No change was observed in the vinyltoluene samples in the final three vials.

After twenty-three hours, the vinyltoluene samples in the first three vials had hardened to a non-flowable mass which was not only wholly insoluble in toluene, but could not even be mixed with the toluene. The vinyltoluene samples in the second three vials had polymerized to a soft mass which, although partially insoluble, was miscible with toluene and was readily penetrable with a stirring rod. Again no change was observed in the vinyltoluene samples in the final three vials.

This test demonstrates that the presence of copper does inhibit polymerization of vinyl aromatic monomers such as vinyltoluene, and further that the presence of copper does not adversely affect the effectiveness of other chemical inhibitors.

The foregoing description and examples have been set forth merely for purposes of exemplification and are not intended as limiting. Since modifications of the disclosed embodiments within the scope and spirit of the invention may occur to persons skilled in the art, the scope of the invention is to be limited solely by the scope of the appended claims:

We claim:

1. A method for inhibiting the formation of polymerized vinylaromatic compounds during distillative purification of vinylaromatic monomer from a crude feed comprising vinylaromatic monomer admixed with lower and higher boiling materials, said method comprising distilling said vinylaromatic monomer from said crude feed in the presence of a cupreous metallic surface on the interior of a distillation column used to effect said distillation.

2. Method according to claim 1 wherein said crude feed is first distilled to separate a recycle overhead fraction comprising lower boiling materials from a recycle bottoms fraction comprising vinylaromatic monomer and higher boiling materials, and said recycle bottoms fraction is then distilled to separate a finish overhead fraction comprising substantially pure vinylaromatic monomer from a finish bottoms fraction comprising higher boiling materials.

3. Method according to claim 2 further comprising flashing said finish bottoms fraction to recover residual vinylaromatic monomer therefrom and recycling the recovered residual monomer to the finish distillation step.

4. Method according to claim 2 further comprising distilling said recycle overhead fraction to separate a bottoms fraction of alkylbenzene precursor for said vinylaromatic monomer from an overhead fraction comprising other lower boiling materials, and feeding said alkylbenzene bottoms fraction to a dehydrogenation reactor for producing additional crude vinylaromatic monomer feed.

5. Method according to claim 2 wherein said cupreous material is present during the distillation of said recycle overhead fraction from said recycle bottoms fraction.

6. Method according to claim 2 wherein said cupreous material is present during the distillation of said finish overhead fraction from said finish bottoms fraction.

7. Method according to claim 2 wherein said cupreous material is present during the distillation of said recycle overhead fraction from said recycle bottoms fraction and during the distillation of said finish overhead fraction from said finish bottoms fraction.

8. Method according to claim 1 wherein said distillation is effected at subatmospheric pressure.

9. Method according to claim 8 wherein said distillation is effected at a temperature from about 65 degrees C. to about 138 degrees C. and an absolute pressure from about 0.013 atmosphere to about 0.26 atmosphere.

10. Method according to claim 9 wherein said temperature lies in the range from about 90 degrees C. to about 115 degrees C.

11. Method according to claim 1 wherein said distillation takes place in the presence of an additional polymerization inhibitor.

12. Method according to claim 11 wherein said inhibitor comprises at least one compound selected from the group consisting of dinitro-o-cresol, dinitro-p-cresol, m-nitro-p-cresol, dinitrophenol, N-nitroso-diphenylamine, 4-halo-3,5-dinitrotoluene, and 3-nitro-2,5-cresotic acid.

13. Method according to claim 11 wherein said additional inhibitor is present in an amount from about 50 to about 3000 parts per million with respect to said vinylaromatic monomer.

14. Method according to claim 13 wherein said inhibitor is present in an amount from about 200 to about 1000 parts per million with respect to said vinylaromatic monomer.

15. Method according to claim 11 wherein said additional inhibitor comprises a mixture of a first inhibitor substance active primarily in the vapor phase and a second inhibitor substance active primarily dissolved in the liquid phase in said distillation.

16. Method according to claim 11 wherein said additional inhibitor comprises a mixture of dinitro-p-cresol and N-nitroso-diphenylamine.

17. Method according to claim 11 wherein said additional inhibitor is introduced to said distillation in admixture with the crude feed.

18. Method according to claim 11 wherein said additional inhibitor is introduced directly into at least one distillation column in which said distillation takes place.

19. Method according to claim 11 wherein said additional inhibitor is introduced into a reboiler used to maintain the distillation column used for said distillation at distillation temperature.

20. Method according to claim 1 wherein said cupreous metallic surface is an alloy of copper with at least one metal selected from the group consisting of tin, zinc and nickel.

21. Method according to claim 1 wherein low vapor velocity regions of a distillation column used to effect the distillation are provided with a coating of cupreous metal.

22. Method according to claim 1 wherein said vinylaromatic monomer is selected from the group consisting of styrene, vinyltoluene, alpha-alkylstyrene, and divinylbenzene.

23. Method according to claim 22 wherein said vinylaromatic monomer is vinyltoluene.

24. Method according to claim 22 wherein said vinylaromatic monomer is styrene.

25. A method according to claim 1 wherein gas/liquid contact devices in the interior of said distillation column have a metallic copper surface.

26. Method according to claim 25 wherein the undersides of the seal pans in said distillation column are coated with cupreous metal.

* * * * *